(12) United States Patent
Varghese et al.

(10) Patent No.: US 10,873,543 B2
(45) Date of Patent: Dec. 22, 2020

(54) FIBER CHANNEL FABRIC LOGIN/LOGOUT SYSTEM

(71) Applicant: Dell Products L.P., Round Rock, TX (US)

(72) Inventors: Vibin Varghese, Tamil Nadu (IN); Ramesh Kumar Subbiah, Tamil Nadu (IN); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 16/259,536

(22) Filed: Jan. 28, 2019

(65) Prior Publication Data

US 2020/0244599 A1 Jul. 30, 2020

(51) Int. Cl.
*H04L 12/28* (2006.01)
*H04L 12/931* (2013.01)
*H04L 12/24* (2006.01)
*H04L 12/937* (2013.01)

(52) U.S. Cl.
CPC ........ *H04L 49/357* (2013.01); *H04L 41/0813* (2013.01); *H04L 41/12* (2013.01); *H04L 49/253* (2013.01)

(58) Field of Classification Search
CPC ..... H04L 41/12; H04L 41/0803; H04L 45/02; H04W 8/005; H04W 84/18
See application file for complete search history.

(56) References Cited

U.S. PATENT DOCUMENTS

| | | | | |
|---|---|---|---|---|
| 2007/0147267 | A1* | 6/2007 | Holland | H04L 67/1097 370/252 |
| 2007/0199053 | A1* | 8/2007 | Sandhu | H04L 9/0825 726/4 |
| 2012/0163174 | A1* | 6/2012 | Shukla | H04L 49/505 370/235 |
| 2012/0163395 | A1* | 6/2012 | Shukla | H04L 61/6004 370/409 |
| 2015/0358202 | A1* | 12/2015 | Varble | H04L 67/1097 370/254 |
| 2017/0317918 | A1* | 11/2017 | Vemula | H04L 49/357 |

* cited by examiner

*Primary Examiner* — Atique Ahmed
(74) *Attorney, Agent, or Firm* — Haynes and Boone, LLP

(57) ABSTRACT

An FC fabric login/logout system includes an FC switch device coupled to an endpoint device by an intermediate FC fabric device. The intermediate FC fabric device receives a first FC fabric login from the endpoint device and, in response, performs FC fabric login operations to create an FC fabric session between the endpoint device and the FC switch device, and stores FC fabric session information in hardware table(s). When the intermediate FC fabric device determines that an FC fabric session time period has passed, it ends the FC fabric session by clearing the FC fabric session information from the hardware table(s), and stores the FC fabric session information in software table(s). If the intermediate FC fabric device then receives a second FC fabric login from the endpoint device, it recreates the FC fabric session by transferring the FC fabric session information from the software table(s) to the hardware table(s).

20 Claims, 8 Drawing Sheets

FIBER CHANNEL FABRIC LOGIN/LOGOUT SYSTEM

BACKGROUND

The present disclosure relates generally to information handling systems, and more particularly to providing for the logging in and logging out of information handling systems to a Fiber Channel fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, or other endpoint devices known in the art, are sometimes connected via a Fiber Channel (FC) fabric. As would be understood by one of skill in the art, such FC fabrics may include FC switch devices, FC Forwarder (FCF) devices, N_Port Identifier Virtualization (NPIV) Protocol Gateway (NPG) devices, Fibre Channel over Ethernet (FCoE) Initialization Protocol (FIP) Snooping Bridge (FSB) devices, and/or other devices that are configured to transmit communications between, for example, server devices and storage devices provided in Storage Area Networks (SANs). In order to enable the transmission of those communications, the server devices log into the FC fabric using a variety of FC fabric login communications known in the art. However, once logged into the FC fabric, those server devices will remain logged into the FC fabric until logged out by a network administrator, which can result in inefficient of FC fabric access resources in FC fabric devices (e.g., NPG devices), particularly when the server devices and/or applications on those server devices that only require occasional access to the SAN. For example, in some FC topologies, theoretically supported server device limits can be exceeded due to hardware table limitations such as, for example, Access Control List (ACL) space limits in the NPG devices or FSB devices discussed above. Furthermore, access gateways such as the NPG devices may include a limited number of ports, which limits the number of sessions available via those ports. As such, the indefinite allocation of FC fabric access resources to server devices that utilize the FC fabric in a limited manner is inefficient, and requires manual intervention by a network administrator in order to free up those FC fabric access resources for devices with which they may be more efficiently utilized.

Accordingly, it would be desirable to provide an improved FC fabric system.

SUMMARY

According to one embodiment, an Information Handling System (IHS) includes a processing system; and a memory system that is coupled to the processing system and that includes instructions that, when executed by the processing system, cause the processing system to provide a login/logout engine that is configured to: receive, from an endpoint device, a first FC fabric login communication; perform, with an FC switch device in response to the first FC fabric login communication, FC fabric login operations that result in the creation of an FC fabric session between the endpoint device and the FC switch device and the storage of FC fabric session information for the FC fabric session in at least one hardware table; determine that an FC fabric session time period for the FC fabric session has passed and, in response, end the FC fabric session by clearing the FC fabric session information from the at least one hardware table, and store the FC fabric session information in at least one software table; receive, from the endpoint device subsequent to the ending of the FC fabric session information, a second FC fabric login communication; and recreate, in response to the second FC fabric login communication, the FC fabric session between the endpoint device and the FC switch device by transferring the FC fabric session information from the at least one software table to the at least one hardware table.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
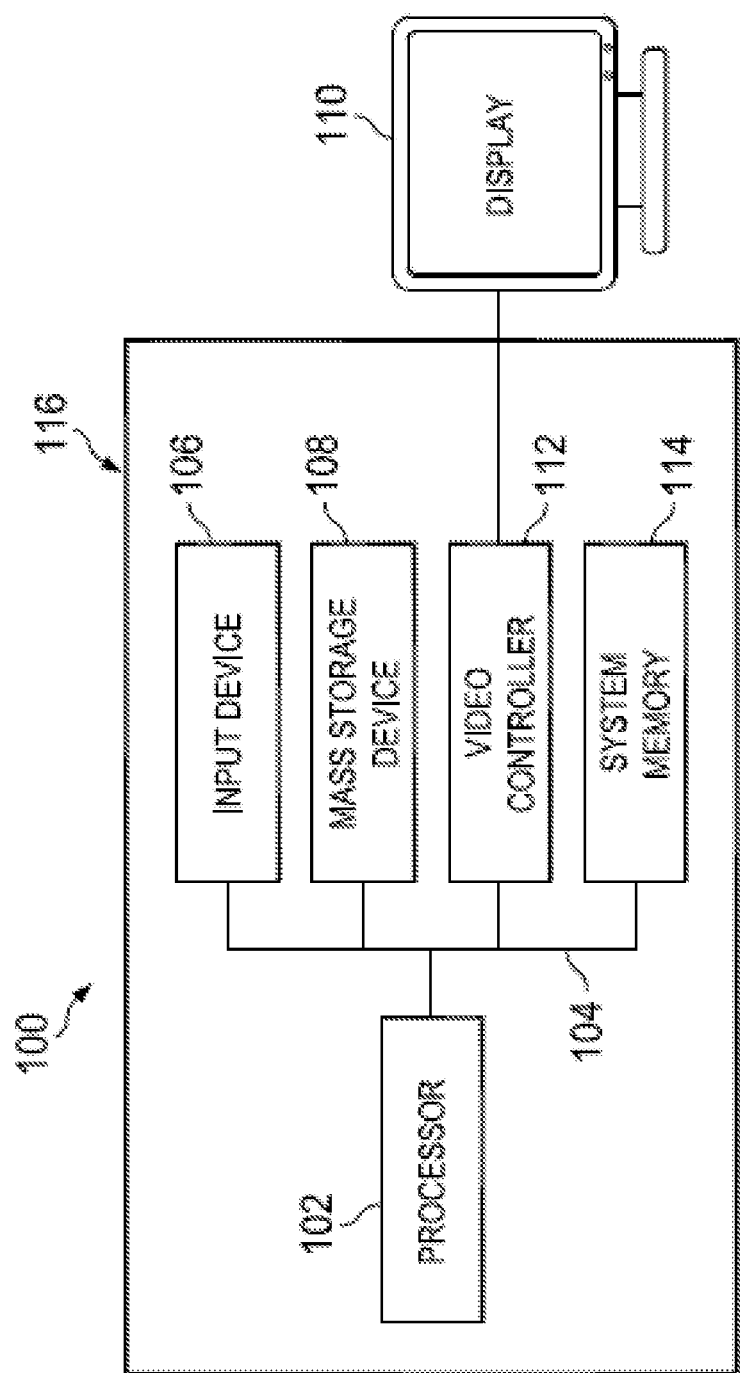
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
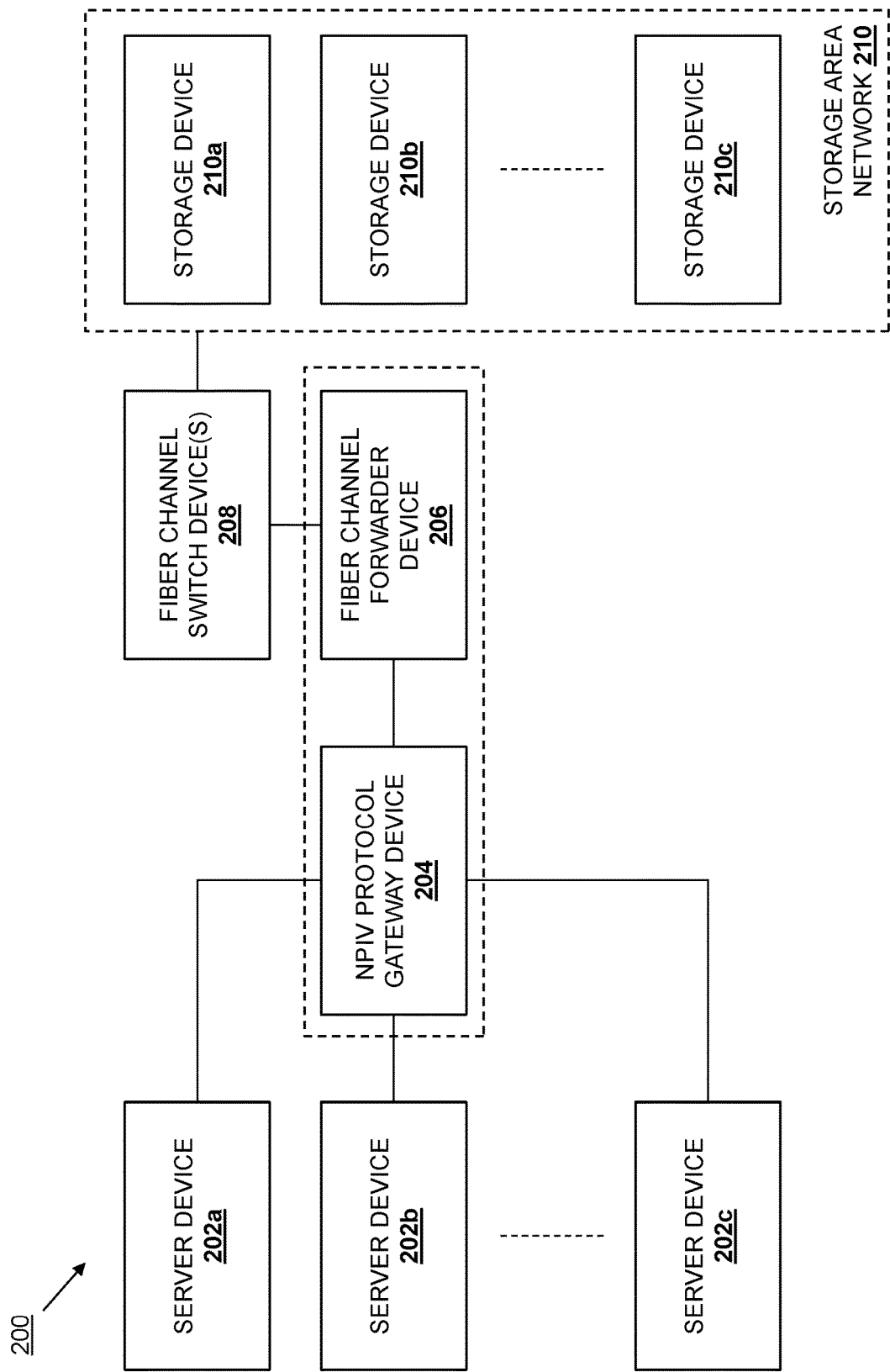
FIG. 2 is a schematic view illustrating an embodiment of a Fiber Channel (FC) fabric login/logout system.

Referring now to FIG. 2, an embodiment of a Fiber Channel (FC) fabric login/logout system 200 is illustrated. In the illustrated embodiment, the FC fabric login/logout system 200 includes a plurality of endpoint devices that are provided by server devices 202*a*, 202*b*, and up to 202*c* in FIG. 2. Any of the server devices 202*a-c* may be provided by the IHS 100 discussed above with reference to FIG. 1, and/or may include some or all of the components of the IHS 100. For example, any of the server devices 202*a-c* may be provided by FCoE device (e.g., an "enode device"). Furthermore, in some of the specific examples discussed below, the endpoint devices provided by the server devices 202*a-c* in FIG. 2 operate as target devices, but one of skill in the art in possession of the present disclosure will recognize that the endpoint devices provided by the server devices 202*a-c* in FIG. 2 may operate as host devices while remaining within the scope of the present disclosure as well. In the illustrated embodiment, the server devices 202*a-c* are coupled to an intermediate FC fabric device that is provided by an N_Port Identifier Virtualization (NPIV) Protocol Gateway (NPG) device 204 in FIG. 2. The NPG device 204 may be provided by the IHS 100 discussed above with reference to FIG. 1, and/or may include some or all of the components of the IHS 100. As would be understood by one of skill in the art in possession of the present disclosure, the NPG device 204 may present itself as an FC switch device (or an FCoE switch device) to endpoint devices (e.g., the server devices 202*a-c*), but may connect to an FC switch device (or FCoE switch device) opposite those endpoint devices. However, while illustrated and described below as an NPG device, one of skill in the art in possession of the present disclosure will recognize that the intermediate FC fabric device may be provided by an FCoE Initialization Protocol (FIP) Snooping Bridge (FSB) device and/or other intermediate FC fabric devices while remaining within the scope of the present disclosure as well.

In the illustrated embodiment, the NPG device 204 is directly coupled to an FC Forwarder (FCF) device 206, and one of skill in the art will recognize that the NPG device 204 and FCF device 206 may be integrated (as illustrated by the dashed box in FIG. 2) as part of a single system. As such, the FCF device 206 may be provided by the IHS 100 discussed above with reference to FIG. 1, and/or may include some or all of the components of the IHS 100. In the illustrated embodiment, the NPG device 204/FCF device 206 is coupled to one or more FC switch devices 208, any or all of which may be provided by the IHS 100 discussed above with reference to FIG. 1, and/or may include some or all of the components of the IHS 100. Furthermore, any of the FC switch device(s) 208 may be coupled to endpoint device(s) that, in the illustrated embodiment, are provided by a plurality of storage devices 210*a*, 210*b*, and up to 210*c* that are included in a Storage Area Network (SAN) 210. In some of the specific examples discussed below, the endpoint devices provided by the storage devices 210*a-c* in FIG. 2 operate as host devices, but one of skill in the art in possession of the present disclosure will recognize that the endpoint devices provided by the storage devices 210*a-c* in FIG. 2 may operate as target devices while remaining within the scope of the present disclosure as well. While a specific FC fabric login/logout system 200 has been illustrated and described, one of skill in the art in possession of the present disclosure will recognize that FC fabric login/logout systems may be provided using a variety of components and/or component configurations while remaining within the scope of the present disclosure as well.

Figure 3:
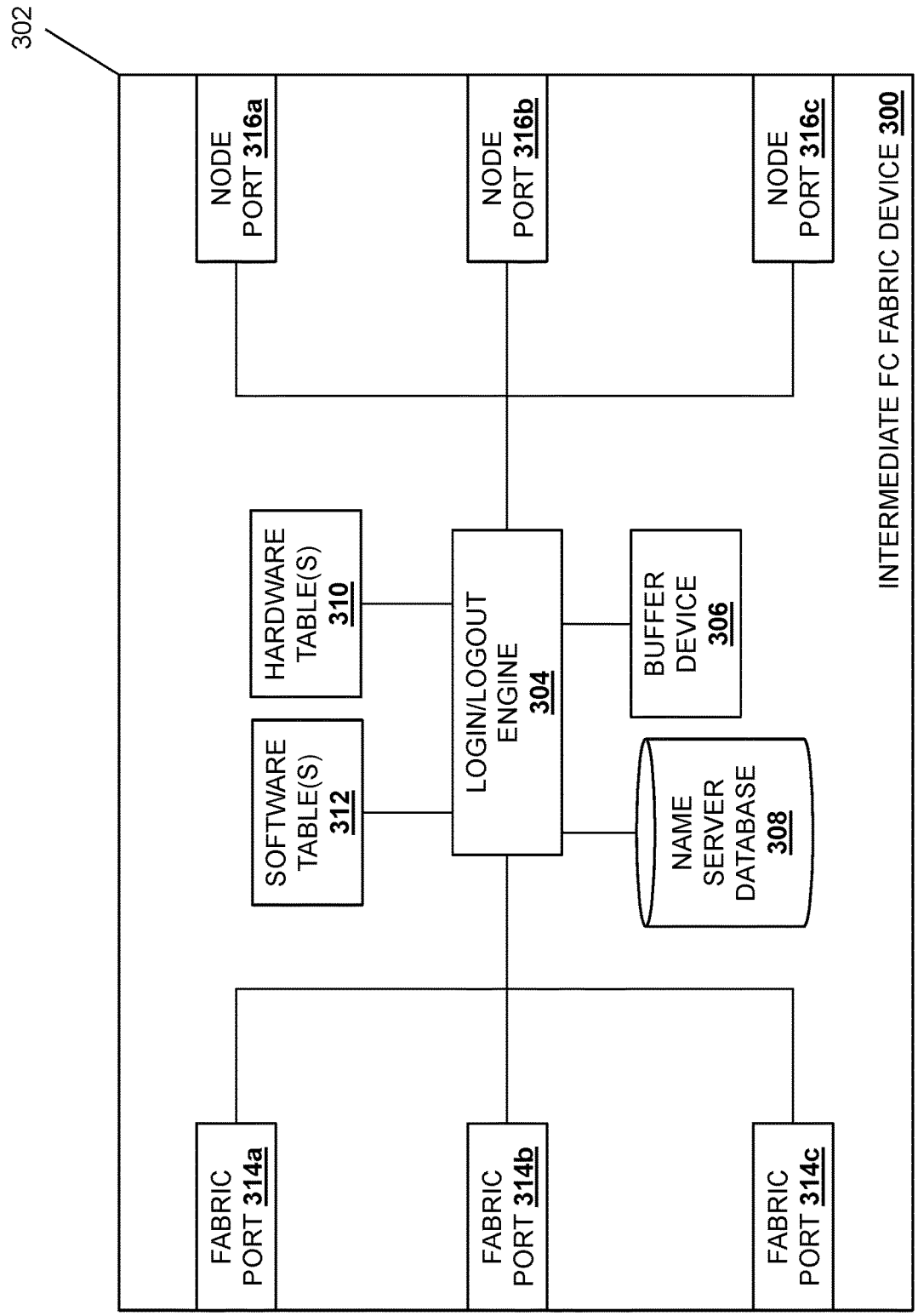
FIG. 3 is a schematic view illustrating an embodiment of an intermediate FC fabric device that may be provided in the FC fabric login/logout system of FIG. 2.

Referring now to FIG. 3, an embodiment of an intermediate FC fabric device 300 is illustrated that may be provided in the FC fabric login/logout system 200 discussed above. As such, the intermediate FC fabric device 300 may be provided by the IHS 100 discussed above with reference to FIG. 1, may include some or all of the components of the IHS 100, and in specific examples may provide the NPG device 204 discussed above with reference to FIG. 2, an FSB device, and/or other intermediate FC fabric devices that would be apparent to one of skill in the art in possession of the present disclosure. In the illustrated embodiment, the intermediate FC fabric device 300 includes a chassis 302 that houses the components of the intermediate FC fabric device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a login/logout engine 304 that is configured to perform the functions of the login/logout engines and/or intermediate FC fabric devices discussed below.

The chassis 302 may also house a buffer device 306 that may be provided, for example, by a Field Programmable Gate Array (FPGA) and/or other buffer devices that would be apparent to one of skill in the art in possession of the present disclosure. The buffer device 306 is coupled to the login/logout engine 304 (e.g., via a coupling between the buffer device 306 and the processing system), and may be configured to buffer or otherwise store any of the information discussed below. The chassis 302 may also house a storage system (not illustrated, but which may be provided by the storage device 108 discussed above with reference to FIG. 1) that is coupled to the login/logout engine 304 (e.g., via a coupling between the storage device and the processing system), and that includes a name server database 308 that may be configured to store any of the information discussed below.

The chassis 302 also houses one or more hardware table(s) 310 that are coupled to the login/logout engine 304 (e.g., via a coupling between the hardware table(s) 310 and the processing system), and that may be configured to store the FC fabric session information for the FC fabric sessions discussed below. For example, the hardware table(s) 310 may be provided by a Network Processing Unit (NPU) or other network processing systems known in the art, and may store information including Access Control Lists (ACLs) and/or any other information that would be apparent to one of skill in the art in possession of the present disclosure. The chassis 302 also houses one or more software table(s) 312 that are coupled to the login/logout engine 304 (e.g., via a coupling between the software table(s) 312 and the processing system), and that may be configured to store the FC fabric session information for the virtual FC fabric sessions discussed below. For example, the software table(s) 310 may be provided by a Central Processing Unit (CPU), and may store information including the session details that are associated with end devices that are logged out of the FC fabric and that may be utilized to rebuild ACLs in hardware tables when those end devices re-log into the FC fabric as discussed below, and/or any other information that would be apparent to one of skill in the art in possession of the present disclosure.

In the illustrated embodiment, the chassis 302 houses a plurality of fabric ports (F_ports) 314a, 314b, and up to 314c, as well as a plurality of node ports (N_ports) 316a, 316b, and 316c, each of which may be coupled to the login/logout engine 304 (e.g., via a coupling between that port and the processing system). As would be understood by one of skill in the art, fabric ports may be utilized to connect node ports to an FC switch in a FC fabric, with the fabric ports 314a-c coupling the NPG device 204 to the server devices 202a-c in FIG. 2, and the node ports 316a-c coupling the NPG device 204/FCF device 206 to the FC switch device(s) 208 in FIG. 2. While a specific intermediate FC fabric device 300 has been illustrated and described, one of skill in the art in possession of the present disclosure will recognize that the intermediate FC fabric device of the present disclosure may include a variety of components and/or component configurations for performing conventional FC functionality, as well as the functionality discussed below, while remaining within the scope of the present disclosure.

Figure 4A:
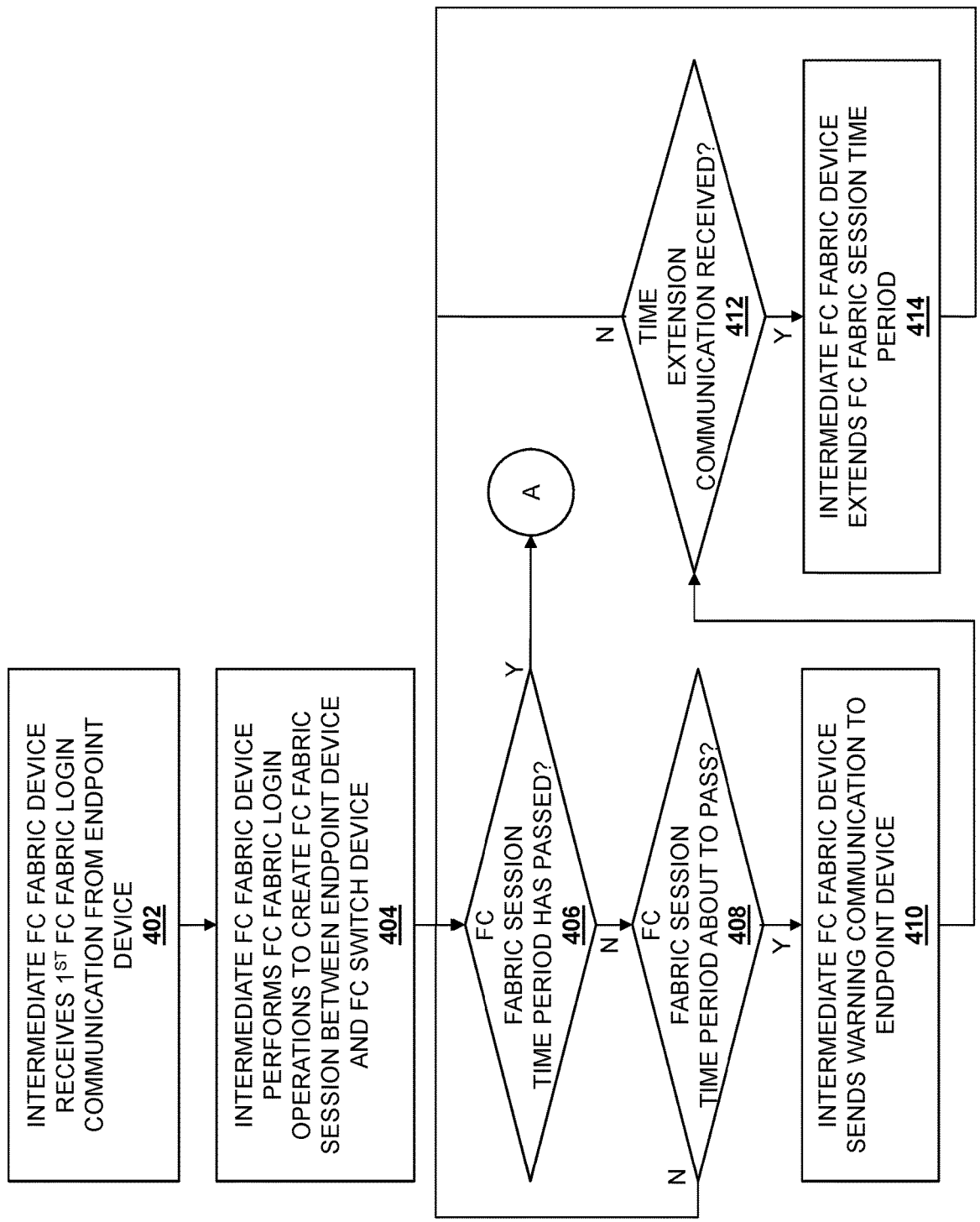
FIGS. 4A and 4B are a flow chart illustrating an embodiment of a method for providing for logging in and logging out of an FC fabric.
Figure 4B:
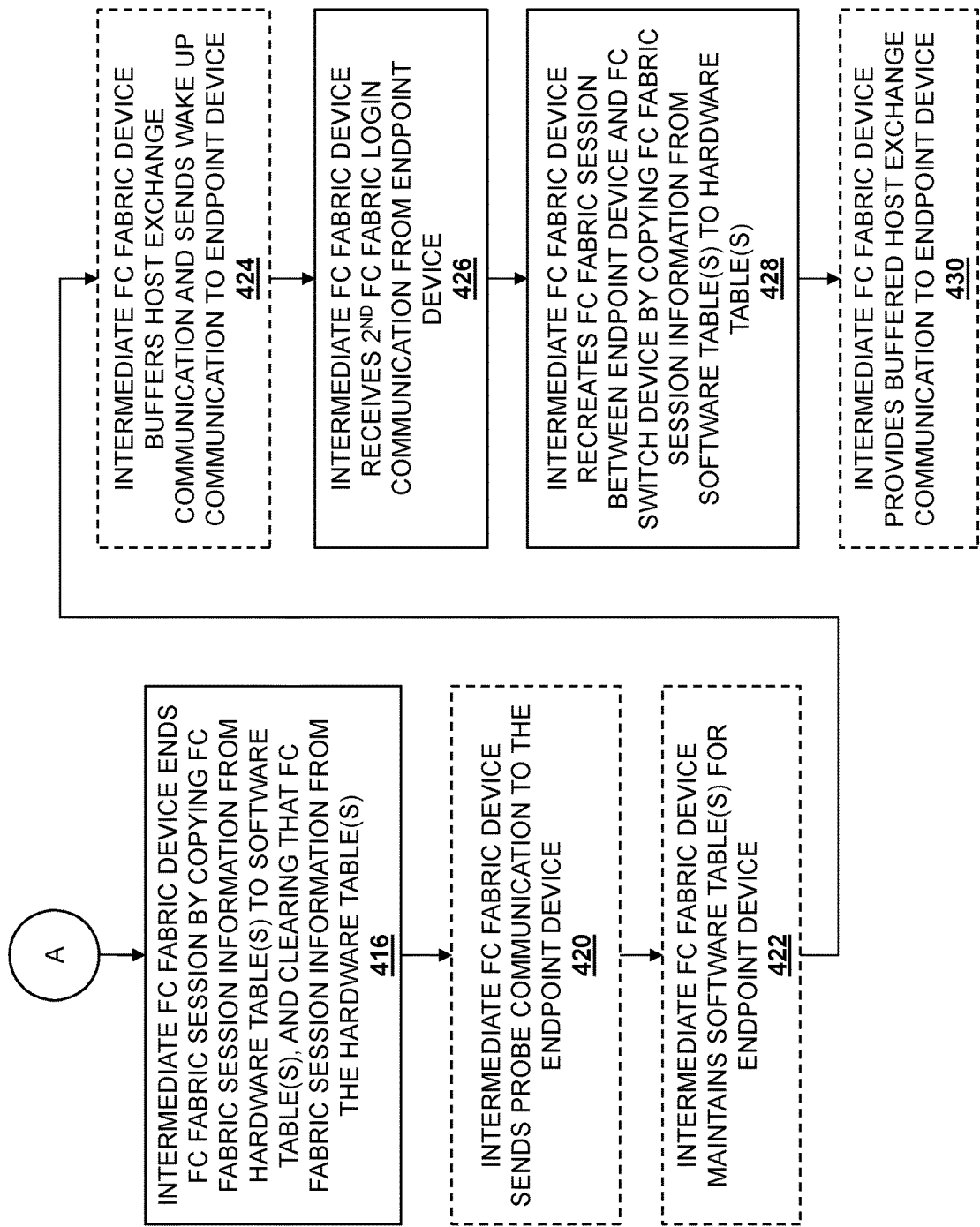

Referring now to FIG. 4, an embodiment of a method 400 for providing for the logging in and logging out of an FC fabric is illustrated. As discussed below, the systems and methods of the present disclosure provide for the logging in and logging out of endpoint devices from an FC fabric via the assignment of FC identifiers to those endpoint devices for limited time periods, rather than allowing those endpoint device to log into the FC fabric and be assigned their FC identifiers indefinitely. Such logging in and logging out of the FC fabric may be controlled by an FC Fabric Login (FLOGI) process, with endpoint devices configured to inform an intermediate FC fabric device of their ability to login/logout of the FC fabric in FLOGI communications. Following being informed of the endpoint device login/logout capability via a FLOGI communication, the intermediate FC fabric device may log the endpoint device into the FC fabric to begin an FC fabric session, and send a link service acknowledgement (LS_CC) communication that information that informs the endpoint device of the login time period for which it will be logged into the FC fabric. Near the end of the logout time period (e.g., when 95% of the logout time period has expired), the intermediate FC fabric device may send a Fibre Channel over Ethernet (FCoE) Initialization Protocol (FIP) communication that indicates to the endpoint device that its login is about to be cleared and its FC fabric session ended, and the endpoint device may either log out, or respond with a FIP communication that requests an increase in the login time period (which the intermediate FC fabric device may grant and, as a result, extend the login time period.)

Following the login time period, the intermediate FC fabric device may terminate the FC fabric session for the endpoint device via the sending of a Clear Virtual Link (CVL) communication to the endpoint device. However, the FC fabric session provided for the endpoint device by an FC switch device in the FC fabric may be maintained by that FC switch device, with that FC switch device operating as if the endpoint device is still logged into the FC fabric. The FC fabric session that was terminated by the intermediate FC fabric device may be maintained by the intermediate FC fabric device as a virtual FC fabric session provided by virtual FC fabric session information stored in software table(s) in the intermediate FC fabric device, and if the endpoint device attempts to log back into the FC fabric, the FC fabric session may be recreated (e.g., via that virtual FC fabric session that is maintained in the software table(s)) to provide the same FC identifier and name server queries to that endpoint device. The intermediate FC fabric device may periodically send probe communications to endpoint device for which virtual FC fabric sessions are being maintained in order to ensure the availability of those endpoint devices, and if probe response communications are not received back, the virtual FC fabric sessions for those endpoint devices may be terminated by erasing their associated virtual FC fabric session information from the software table(s).

In the event the intermediate FC fabric device receives an exchange communication provided by a host device for the endpoint device (operating as a target device) for which a virtual FC fabric session is being maintained, the intermediate FC fabric device may buffer those exchange communications and send a FIP communication to that endpoint device that operates as a wakeup communication that causes the endpoint device to log back into the FC fabric so that the intermediate FC fabric device may provide the buffered exchange communications to that endpoint device. In the event the endpoint device does not respond to the wakeup communication, the buffered exchange communications and the virtual FC fabric session information are erased, and a logout (LOGO) is provided to the FC switch device in the FC fabric to end the FC fabric session provided by that FC switch device for the endpoint device. As such, temporary allocation of FC fabric access resources (e.g., hardware table resources such as ACL lists) to server devices that utilize the FC fabric in a limited manner is provided, eliminating the need for manual intervention by a network administrator in order to free up those FC fabric access resources for devices with which they may be more efficiently utilized.

The method 400 begins at block 402 where an intermediate FC fabric device receives a first FC fabric login communication from an endpoint device. In an embodiment, at or prior to block 402, the NPG device 204/FCF device 206 may operate to log into the FC fabric provided by the FC switch device(s) 208. For example, with reference to FIG. 5, the login/logout engine 304 in the NPG device 204/300 may generate and transmit a FLOGI communication 502 to the FC switch device 208 and, in response, the FC switch device 208 may log the NPG device 204 into the FC fabric, and generate and transmit an LS_ACC communication 504 to the NPG device 204. While not described herein in detail, one of skill in the art in possession of the present disclosure will recognize how FC communications (such as the FLOGI and LS-ACC communications in the illustrated example) may be utilized to log intermediate FC fabric devices (such as the NPG device 204 in the illustrated example) into an FC fabric. As such, at block 402, the NPG device 204 is logged into the FC fabric. In an embodiment, at block 402, the server device 202a may generate and transmit a FLOGI communication 506 to the NPG device 204 in order to attempt to login to the FC fabric. As such, at block 402, the NPG device 204 receives the FLOGI communication 506.

The method 400 then proceeds to block 404 where the intermediate FC fabric device performs FC fabric login operations to create an FC fabric session between the endpoint device and an FC switch device. In an embodiment, at block 404 and in response to receiving the FLOGI communication 506 from the server device 202a, the login/logout engine 304 in the NPG device 204/300 may generate and transmit a fabric discovery (FDISC) communication to the FC switch device 208. In response to receiving the FDISC communication 508, the FC switch device 208 may log the server device 202a into the FC fabric to create an FC fabric session, and generate and transmit an LS_ACC communication 510 back to the NPG device 204 (e.g., via the FCF device 206). While not described herein in detail, one of skill in the art in possession of the present disclosure will recognize how FC communications (such as the FDISC and LS-ACC communications in the illustrated example) may be utilized to log endpoint devices (such as the server device 202a in the illustrated example) into an FC fabric to provide an FC fabric session for that endpoint device. Furthermore, the creation of the FC fabric session for the server device 202a may include the login/logout engine 304 in the NPG device 204/300 storing FC fabric session information for that FC fabric session (e.g., an assigned FC identifier, name server information, and/or any other FC fabric session information known in the art) in the hardware table(s) 310, the name server database 308, and/or any other storage subsystem included in the NPG device 204/300. In response to receiving the LS_ACC communication 510, the login/logout engine 304 in the NPG device 204 generates and transmits an LS_ACC communication 512 to the server device 202a, and that LS_ACC communication 512 may include and/or indicate a login time period 514 for which the server device 202a will be logged into the FC fabric for the FC fabric session (illustrated by a dashed line in FIG. 5). In an embodiment, the login time period 514 may be selected by the login/logout engine 304 in the NPG device 204/300 based on any of a variety of factors that would be apparent to one of skill in the art in possession of the present disclosure.

The method 400 then proceeds to decision block 406 where the intermediate FC fabric device determines whether the FC fabric session time period has passed. In an embodiment, at decision block 406 and following the creation of the FC fabric session for the server device 202a, the login/logout engine 304 in the NPG device 204/300 may monitor the amount of time that the FC fabric session has been provided for the server device 202a, and determine whether that FC fabric session has exceeded the login time period 514 discussed above. As discussed above, the login time period 514 for the FC fabric session provided for the server device 202a may vary depending on a variety of considerations, and the login/logout engine 304 may monitor any FC fabric sessions to determine whether they have exceeded their associate login time periods while remaining within the scope of the present disclosure.

If, at decision block 406, the intermediate FC fabric device determines that the FC fabric session time period has not passed, the method 400 proceeds to decision block 408 where the intermediate FC fabric device determines whether the FC fabric session time period is about to pass. In an embodiment, at decision block 408, the login/logout engine 304 in the NPG device 204/300 may determine whether that FC fabric session has exceeded some predetermined percentage of the login time period 514 discussed above. For example, the login/logout engine 304 may be configured to determine that the login time period 514 for the FC fabric session is about to pass when the FC fabric session has been provided for 95% of the login time period 514. However, while a particular percentage of the login time period 514 has been described, one of skill in the art will recognize that a variety of factors may be considered when determining whether the login time period 514 is about to pass.

If, at decision block 408, the intermediate FC fabric device determines that the FC fabric session time period is not about to pass, the method 400 returns to decision block 406 where the intermediate FC fabric device determines whether the FC fabric session time period has passed in substantially the same manner as described above. If, at decision block 408, the intermediate FC fabric device determines that the FC fabric session time period is about to pass, the method 400 proceeds to block 410 where the intermediate FC fabric device sends a warning communication to the endpoint device. In an embodiment, at block 410, the login/logout engine 304 in the NPG device 204 may generate and transmit an FIP descriptor warning communication 516 to the server device 202a that indicates to the server device 202a that its FC fabric session/login to the FC fabric is about to be cleared (from hardware table(s)) in the NPG device 204. However, while a specific warning communication has been described, the server device 202a may be informed that its FC fabric session is about to end in a variety of manners that would be apparent to one of skill in the art in possession of the present disclosure, and in some embodiments, the server device 202a may not receive any warnings that its FC fabric session is about to end.

Figure 6:
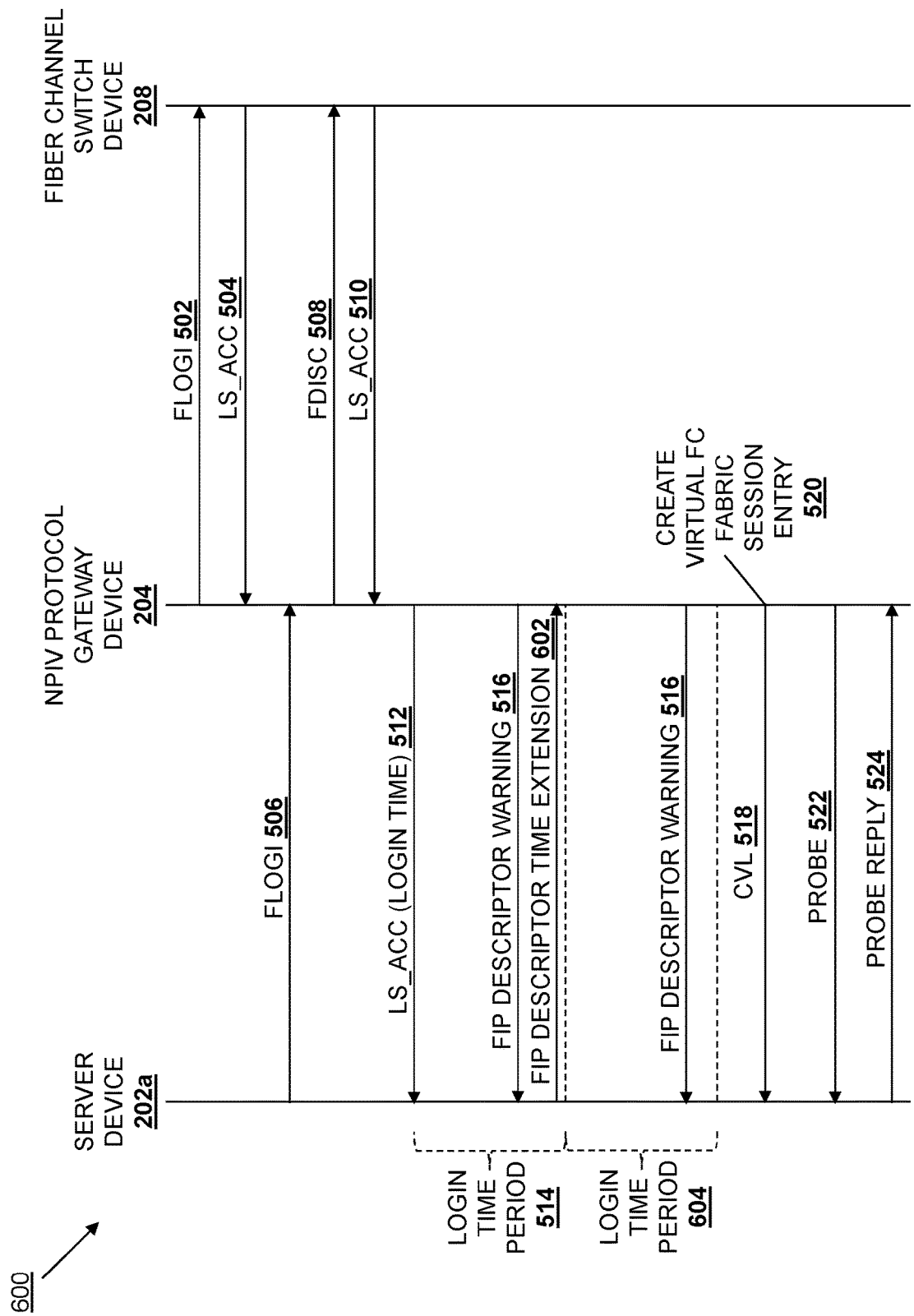
FIG. 6 is a swim-lane diagram illustrating an embodiment of communications that may be provided in the FC fabric login/logout system of FIG. 2 during the method of FIG. 4.

The method 400 then proceeds to decision block 412 where the intermediate FC fabric device determines whether a time extension communication has been received. In an embodiment, at decision block 412, the login/logout engine 304 in the NPG device 204/300 may monitor for the receiving of time extension communications from the server device 202a. For example, as illustrated in FIG. 6, following the receiving of the FIP descriptor warning communication 516, the server device 202a may generate and transmit a FIP descriptor time extension communication 602 that requests for a time extension to the login time period 514 (e.g., because exchange communications with another endpoint device are in progress, because the server device 202a needs continued access to the SAN 210, etc.) However, while the login/logout engine 304 has been illustrated and described as receiving the time extension communication in a FIP descriptor, the time extension request may be communicated by the server device 202a to the NPG device 204 in any of a variety of manners that would be apparent to one of skill in the art in possession of the present disclosure.

If, at decision block 412, the intermediate FC fabric device determines that the time extension communication has not been received, the method 400 returns to decision block 406 where the intermediate FC fabric device determines whether the FC fabric session time period has passed in substantially the same manner as described above. If, at decision block 412, the intermediate FC fabric device determines that the time extension communication has been received, the method 400 proceeds to block 414 where the intermediate FC fabric device extends the FC fabric session time period. In an embodiment, at block 414 and in response to receiving the FIP descriptor time extension communication 602, the login/logout engine 304 in the NPG device 204/300 may provide a login time period 604 that follows the login time period 514 and that extends the FC fabric session being provided to the server device 202a (illustrated by dashed lines in FIG. 6.) While only a single time extension (e.g., providing the login time period 604 following the login time period 514) is illustrated in FIG. 6, one of skill in the art in possession of the present disclosure will recognize how the server device 202a may generate and transmit further FIP descriptor time extension communications to cause the NPG device 204 to provide additional login time periods while remaining within the scope of the present disclosure as well.

If, at decision block 406, the intermediate FC fabric device determines that the FC fabric session time period has passed, the method 400 proceeds to block 416 where the intermediate FC fabric device ends the FC fabric session being provided to the endpoint device by clearing FC fabric session information from its hardware table(s). In an embodiment, at block 416 and following the expiration of the login time period 514 or 604, the login/logout engine 304 in the NPG device 204/300 may create a virtual FC fabric session entry for the FC fabric session provided to the server device 202a. In an embodiment, the creation of the virtual FC fabric session entry by the login/logout engine 304 may include copying the FC fabric session information for the FC fabric session (e.g., the assigned FC identifier, the name server entries, etc.) that is included in the hardware table(s) 310 discussed above, storing that FC fabric session information in the software table(s) 312 provided in the NPG device 204, and then erasing that FC fabric session information from the hardware table(s) 310. Furthermore, at block 416, the login/logout engine 304 in the NPG device 204/300 may generate and transmit a Clear Virtual Link (CVL) communication 518 to the server device 202a. One of skill in the art in possession of the present disclosure will recognize that the receiving of the CVL communication by the server device 202a may cause the server device 202a to clear the FC fabric session details from its corresponding databases, and subsequently re-login to the FC fabric when needed.

Thus, following block 416, the FC fabric session information for the FC fabric session provided to the server device 202a is no longer stored in hardware table(s) in the NPG device, thus freeing up those hardware table resources to provide FC fabric sessions to other endpoint devices. However, while the FC fabric session for the server device 202a only exists as a virtual FC fabric session provided by the virtual FC fabric session entry 520 discussed above, the FC switch device 208 operates as if the server device 202a is still logged into the FC fabric and Is still part of an FC fabric session. As such, the NPG device 204 may provide virtual FC fabric session entries for any number of endpoint devices, which allows the hardware table resources to be allocated to provide FC fabric sessions only to the endpoint devices that need them to access other endpoint devise connected to the FC fabric, while saving virtual FC fabric sessions as virtual FC fabric session entries in software table(s) for endpoint devices that do not currently need to utilize the FC fabric to access other endpoint devices.

Figure 5:
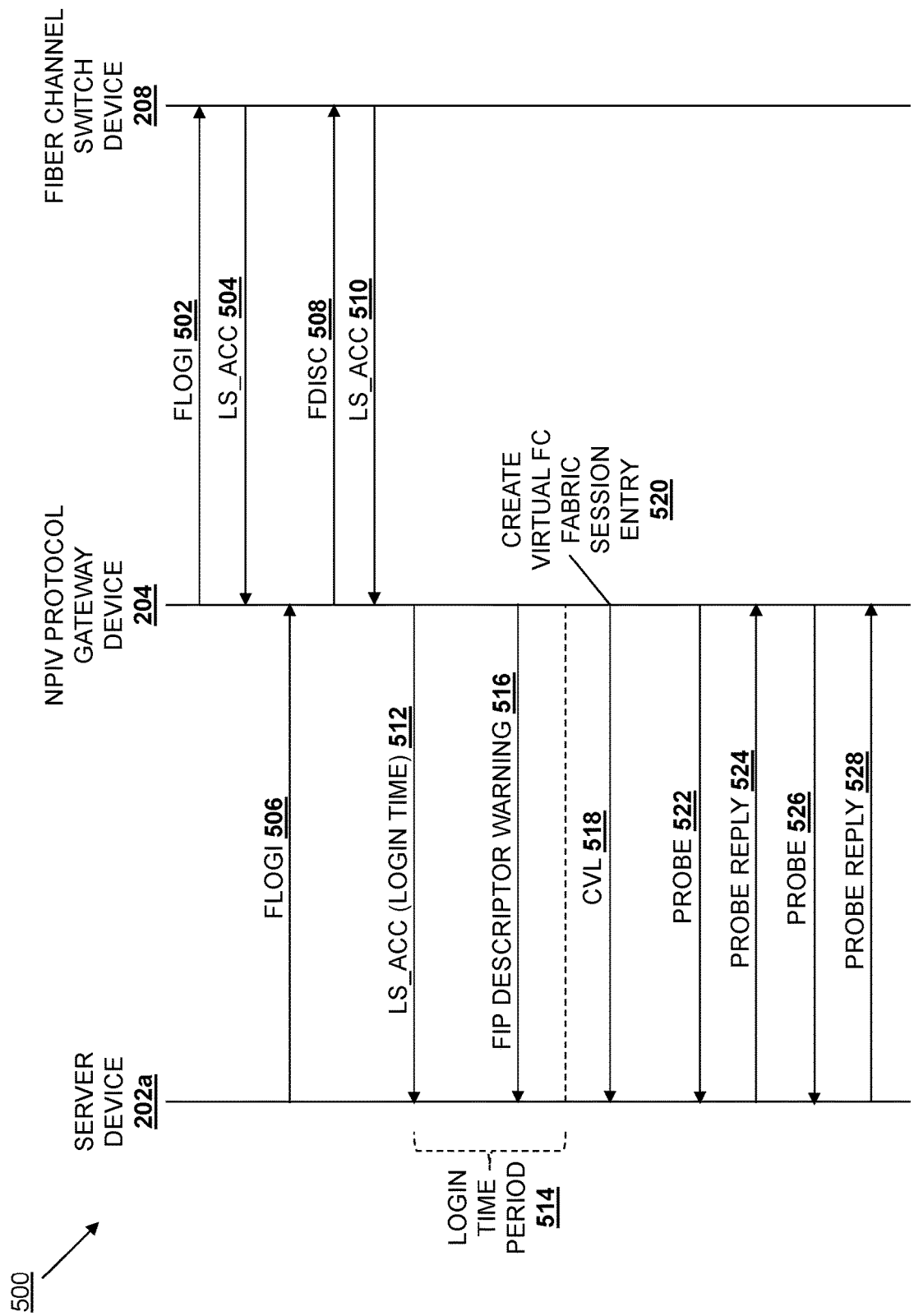
FIG. 5 is a swim-lane diagram illustrating an embodiment of communications that may be provided in the FC fabric login/logout system of FIG. 2 during the method of FIG. 4.

The method 400 may then proceed to optional block 420 where the intermediate FC fabric device may send a probe communication to the endpoint device. In an embodiment, at block 420 and for endpoint devices that have the virtual FC fabric sessions saved as the virtual FC fabric session entries discussed above, the login/logout engine 304 in the NPG device 204/300 may periodically send probe communications and wait for probe reply communications in order to determine whether those endpoint devices are still available and should have their virtual FC fabric sessions maintained. For example, FIGS. 5 and 6 illustrate the login/logout engine 304 in the NPG device 204/300 generating and transmitting a probe communication 522 (e.g., provided in a FIP descriptor communication) to the server device 202a, and the server device 202a generating and transmitting a probe reply communication 524 back to the NPG device 204 in response. Similarly, FIG. 5 illustrates the login/logout engine 304 in the NPG device 204/300 generating and transmitting a probe communication 526 to the server device 202a, and the server device 202a generated and transmitting a probe reply communication 528 back to the NPG device 204 in response. As such, as long as the server device 202a continues to reply to probe communications with probe reply communications (e.g., within some designated probe reply time period), the login/logout engine 304 in the NPG device 204/300 will maintain the virtual FC fabric session for the server device 202a. However, in the event the server device 202a fails to reply to a probe communication with a probe reply communication, the login/logout engine 304 in the NPG device 204/300 will end the virtual FC fabric session for the server device 202a by removing the virtual FC fabric session entry associated with that virtual FC fabric session from the software table(s) 312 in the NPG device 204. As would be appreciated by one of skill in the art in possession of the present disclosure, the ending of the virtual FC fabric session may be accompanies by the sending of a logout (LOGO) to the FC switch device 208 to cause the server device 202a to be logged out of the FC fabric such that the FC switch device 208 no longer operates as if the server device 202a is logged into the FC fabric.

The method 400 may then proceed to optional block 422 where the intermediate FC fabric device may maintain software table(s) for the endpoint device. In an embodiment, at block 422 and for endpoint devices that have the virtual FC fabric sessions saved as the virtual FC fabric session entries discussed above, the login/logout engine 304 in the NPG device 204/300 may maintain the software table(s) 312 and/or other storage subsystems in the NPG device 204/300 with information about the virtual FC fabric session. For example, at block 422 the login/logout engine 304 in the NPG device 204/300 may receive name server query communications and corresponding name server query reply communications, and may snoop those communications to identify the information included therein, and store that information in the name server database 308 in association with any virtual FC fabric sessions that can utilize that information. In some of those examples, local name server entries may be updated by the login/logout engine 304 via the generation of name server queries for the server device 202a.

For example, at block 422 the login/logout engine 304 in the NPG device 204/300 may receive Registered State Change Notification (RSCN) communications (e.g., from the FC switch device 208), and may use the information included therein (e.g., name server queries, etc.) to update name server entries for any particular endpoint device in the name server database 308. While a few examples of the maintenance of the software table(s) for an endpoint device have been provided, one of skill in the art in possession of the present disclosure will recognize that the NPG device 204 may maintain the state of the FC fabric and/or monitor state changes in the FC fabric in a variety of manners that allow the NPG device 204 to report FC fabric changes to endpoint devices that log back into the FC fabric, as discussed in further detail below.

Figure 7:
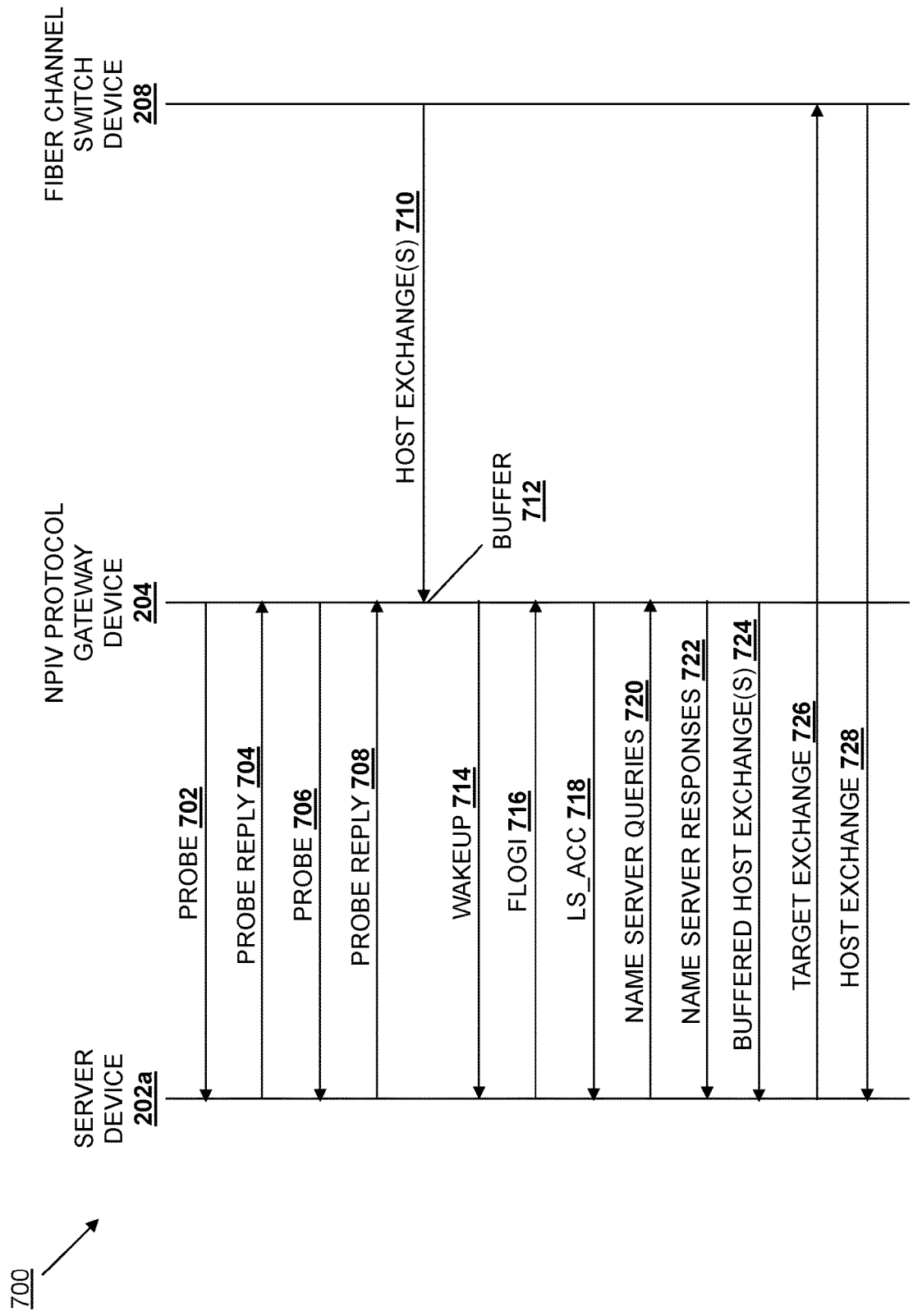
FIG. 7 is a swim-lane diagram illustrating an embodiment of communications that may be provided in the FC fabric login/logout system of FIG. 2 during the method of FIG. 4.

The method 400 may then proceed to optional block 424 where the intermediate FC fabric device may buffer a host exchange communication and send a wake up communication. With reference to FIG. 7, the NPG device 204 is illustrated as sending a probe communication 702 to the server device 202a, receiving a probe reply communication 704 back from the server device 704, sending another probe communication 706 to the server device 202a, and receiving another probe reply communication 708 back from the server device 704. Similarly as discussed above, the probe communications 702 and 706 and the probe reply communications 704 and 708 may be utilized to ensure that the server device 202a continues to be available while its virtual FC fabric session is being maintained, and a failure to receive a probe reply communication in response to a probe communication may result in the virtual FC fabric session for that server device 202a being ended, the virtual FC fabric session information/entry for that virtual FC fabric session being erased from the software table(s) 312 in the NPG device 204, and the server device 202a being logged out of its FC fabric session with the FC switch device 208. As such, following the probe reply communication 708, the virtual FC fabric session for the server device 202a is maintained by the NPG device 204.

In an embodiment, at block 424, the login/logout engine 304 in the NPG device 204/300 may receive host exchange communication(s) 710 from the FC switch device 208. For example, the storage device 210a acting as a host device may generate and transmit the host exchange communication 710 via the switch device(s) 208 to the FC switch device 208, and the FC switch device 208 may forward that host exchange communication 710 to the NPG device 204 (e.g., via the FCF device 206). In response to receiving the host exchange communication 710, the login/logout engine 304 in the NPG device 204/300 may perform a buffer operation 712 to store the host exchange communication(s) 710 in the buffer device 306 (e.g., provided by an FPGA). Furthermore, in response to receiving the host exchange communication(s) 710 and storing them in the buffer device 306, the login/logout engine 304 in the NPG device 204/300 may generate and transmit a FIP descriptor wakeup communication 714 to the server device 202a that may, for example, include an instruction to the server device 202a to perform a login operation to re-login to the FC fabric.

The method 400 then proceeds to block 426 where the intermediate FC fabric device receives a second FC fabric login communication from the endpoint device. In an embodiment, at block 426 (e.g., in response to receiving the wakeup communication 714, in response to determining that it must access the SAN 210, etc.), the server device 202a may generate and transmit a FLOGI communication 716 to the NPG device 204. As discussed above, while the virtual FC fabric session is being maintained by the NPG device 204, the FC switch device 208 operates as if the server device 202a is logged into the FC fabric and part of an existing FC fabric session. As such, a corresponding FLOGI communication is not provided to the FC switch device 208, and rather the FLOGI communication 716 is handled by the NPG device 204 as discussed below.

The method 400 then proceeds to block 428 where the intermediate FC fabric device recreates the FC fabric session between the endpoint device and the FC switch device by copying the FC fabric session information from the software table(s) to the hardware table(s). In an embodiment, at block 428 and in response to receiving the FLOGI communication 716, the login/logout engine 304 in the NPG device 204/300 may operate to recreate the FC fabric session between the server device 202a and the FC switch device 208 by copying the virtual FC fabric session information/entry from the software table(s) 312 in the NPG device 204 to the hardware table(s) 310 in the NPG device 204. For example, in response to receiving the FLOGI communication 716, login/logout engine 304 in the NPG device 204/300 may recreate Access Control List (ACL) entries for the server device 202a in the hardware table(s) 310 in the NPG device 204 using the virtual FC fabric session information/entry stored in the software table(s) 312, and then erase the virtual FC fabric session information from the software table(s) 312. In addition, the login/logout engine 304 in the NPG device 204/300 may respond to the FLOGI communication 716 by generating and transmitting an LS_CC communication 718 to the server device 202a. FIG. 7 illustrates how the server device 202a may then generate and transmit name server query communication(s) 720 to the NPG device 204, and the login/logout engine 304 in the NPG device 204/300 may respond by retrieving the name server information that was stored in the name server database 308 at block 422, and generating and transmitting name server response communication(s) 722 that include that name server information to the server device 202a.

The method 400 may then proceed to optional block 430 where the intermediate FC fabric device may provide the buffered host exchange communication to the endpoint device. In an embodiment, at block 430, the login/logout engine 304 in the NPG device 204/300 may retrieve host exchange communication(s) 710 for the server device 202a that were stored in the buffer device 306 at block 424, and generate and transmit buffered host exchange communication(s) 724 to the server device 202a that include those host exchange communication(s) 710. Following the provisioning of the name server information and/or the buffered host exchange communications to the server device 202a, the server device 202a may generate and transmit target exchange communication 726 to the FC switch device 208 (e.g., for forwarding to the storage device 210a in the SAN 210), and may receive host exchange communications 728 from the FC switch device 206 that were generated and transmitted by endpoint devices acting as host devices (e.g., the storage device 210a discussed above.)

Thus, systems and methods have been described that provide for the logging in of endpoint devices to an FC fabric for limited time periods. For example, endpoint devices may inform an intermediate FC fabric device of their ability to login/logout of the FC fabric in FLOGI communications, and the intermediate FC fabric device receiving those FLOGI communications may log the endpoint device into the FC fabric to begin an FC fabric session. The intermediate FC fabric device will send a link service acknowledgement communication that informs the endpoint device of the login time period for which it will be logged into the FC fabric, and near the end of the logout time period, the intermediate FC fabric device may send a warning communication that indicates to the endpoint device that its login is about to be cleared and its FC fabric session ended. In response, the endpoint device may either log out, or respond with a time extension communication that requests an increase in the login time period (which the intermediate FC fabric device may grant and extend the login time period.) Following the login time period, the intermediate FC fabric device may terminate the FC fabric session for the endpoint device, while maintaining the FC fabric session as a virtual FC fabric session using virtual FC fabric session information stored in software table(s) in the intermediate FC fabric device. If the endpoint device attempts to log back into the FC fabric, the FC fabric session may be recreated (e.g., via that virtual FC fabric session information maintained in the software table(s)), and the intermediate FC fabric device may periodically send probe communications to the endpoint device that require probe reply communications back if the virtual FC fabric session is to be maintained. Finally, host exchange communications received for the endpoint device while it is logged out of the FC fabric may be buffered, and a wakeup communication sent to cause the endpoint device to log back into the FC fabric and be provided the buffered host exchange communications. As such, temporary allocation of FC fabric access resources to server devices that utilize the FC fabric in a limited manner is provided, eliminating the need for manual intervention by a network administrator in order to free up those FC fabric access resources for devices with which they may be more efficiently utilized.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fiber Channel (FC) fabric login/logout system, comprising:
   a Fiber Channel (FC) switch device;
   an endpoint device; and
   an intermediate FC fabric device that couples the FC switch device to the endpoint device, wherein the intermediate FC fabric device is configured to:
      receive, from the endpoint device, a first FC fabric login communication;
      perform, with the FC switch device in response to the first FC fabric login communication, FC fabric login operations that result in creation of an FC fabric session between the endpoint device and the FC switch device and storage of FC fabric session information for the FC fabric session in at least one hardware table;
      determine that an FC fabric session time period for the FC fabric session has passed and, in response, end the FC fabric session by clearing the FC fabric session information from the at least one hardware table, and storing the FC fabric session information in at least one software table;
      receive, from the endpoint device subsequent to the ending of the FC fabric session, a second FC fabric login communication; and
      recreate, in response to the second FC fabric login communication, the FC fabric session between the endpoint device and the FC switch device by transferring the FC fabric session information from the at least one software table to the at least one hardware table.

2. The system of claim 1, wherein the intermediate FC fabric device is configured to:
   transmit, to the endpoint device in response to the first FC fabric login communication, an acknowledgement communication that includes the FC fabric session time period.

3. The system of claim 1, wherein the intermediate FC fabric device is configured to:
   transmit, to the endpoint device following the creation of the FC fabric session and prior to the passing of the FC fabric session time period, a warning communication that indicates that the FC fabric session time period has satisfied a predetermined condition of the FC fabric session time period.

4. The system of claim 1, wherein the intermediate FC fabric device is configured to:
   receive, from the endpoint device prior to the passing of the FC fabric session time period, a time extension communication; and
   extend, in response to the time extension communication, the FC fabric session time period.

5. The system of claim 1, wherein the intermediate FC fabric device is configured to:
   receive, from the FC switch device subsequent to the passing of the FC fabric session time period and prior to receiving the second FC fabric login communication, a host exchange communication;
   store the host exchange communication; and
   provide, following the recreation of the FC fabric session between the endpoint device and the FC switch device, the host exchange communication to the endpoint device.

6. The system of claim 1, wherein the first FC fabric login communication includes a voluntary logout capability indicator that indicates that the endpoint device is capable of voluntarily logging out of the FC fabric.

7. The system of claim 1, wherein the FC switch device is configured to operate as if the FC fabric session exists following the ending of the FC fabric session and prior to the recreation of the FC fabric session.

8. An Information Handling System (IHS), comprising:
   a processing system; and
   a memory system that is coupled to the processing system and that includes instructions that, when executed by the processing system, cause the processing system to provide a login/logout engine that is configured to:
      receive, from an endpoint device, a first FC fabric login communication;
      perform, with an FC switch device in response to the first FC fabric login communication, FC fabric login operations that result in creation of an FC fabric session between the endpoint device and the FC switch device and storage of FC fabric session information for the FC fabric session in at least one hardware table;
      determine that an FC fabric session time period for the FC fabric session has passed and, in response, end the FC fabric session by clearing the FC fabric session information from the at least one hardware table, and storing the FC fabric session information in at least one software table;

receive, from the endpoint device subsequent to the ending of the FC fabric session information, a second FC fabric login communication; and recreate, in response to the second FC fabric login communication, the FC fabric session between the endpoint device and the FC switch device by transferring the FC fabric session information from the at least one software table to the at least one hardware table.

9. The IHS of claim 8, wherein the login/logout engine is configured to:

transmit, to the endpoint device in response to the first FC fabric login communication, an acknowledgement communication that includes the FC fabric session time period.

10. The IHS of claim 8, wherein the login/logout engine is configured to:

transmit, to the endpoint device following the creation of the FC fabric session and prior to the passing of the FC fabric session time period, a warning communication that indicates that the FC fabric session time period has satisfied a predetermined condition of the FC fabric session time period.

11. The IHS of claim 8, wherein the login/logout engine is configured to:

receive, from the endpoint device prior to the passing of the FC fabric session time period, a time extension communication; and extend, in response to the time extension communication, the FC fabric session time period.

12. The IHS of claim 8, wherein the login/logout engine is configured to:

receive, from the FC switch device subsequent to the passing of the FC fabric session time period and prior to receiving the second FC fabric login communication, a host exchange communication;

store the host exchange communication; and provide, following the recreation of the FC fabric session between the endpoint device and the FC switch device, the host exchange communication to the endpoint device.

13. The IHS of claim 8, wherein the first FC fabric login communication includes a voluntary logout capability indicator that indicates that the endpoint device is capable of voluntarily logging out of the FC fabric.

14. A method for providing for logging in and logging out of an FC fabric, comprising:

receiving, by an intermediate Fiber Channel (FC) fabric device from an endpoint device, a first FC fabric login communication;

performing, by the intermediate FC fabric device with an FC switch device in response to the first FC fabric login communication, FC fabric login operations that result in the creation of an FC fabric session between the endpoint device and FC switch device and storage of FC fabric session information for the FC fabric session in at least one hardware table;

determining, by the intermediate FC fabric device, that an FC fabric session time period for the FC fabric session has passed and, in response, ending the FC fabric session by clearing the FC fabric session information from the at least one hardware table, and storing the FC fabric session information in at least one software table;

receiving, by the intermediate FC fabric device from the endpoint device subsequent to the ending of the FC fabric session information, a second FC fabric login communication; and recreating, by the intermediate FC fabric device in response to the second FC fabric login communication, the FC fabric session between the endpoint device and the FC switch device by transferring the FC fabric session information from the at least one software table to the at least one hardware table.

15. The method of claim 14, further comprising:

transmitting, by the intermediate FC fabric device to the endpoint device in response to the first FC fabric login communication, an acknowledgement communication that includes the FC fabric session time period.

16. The method of claim 14, further comprising:

transmitting, by the intermediate FC fabric device to the endpoint device following the creation of the FC fabric session and prior to the passing of the FC fabric session time period, a warning communication that indicates that the FC fabric time period has satisfied a predetermined condition of the FC fabric session time period.

17. The method of claim 14, further comprising:

receiving, by the intermediate FC fabric device from the endpoint device prior to the passing of the FC fabric session time period, a time extension communication; and extending, by the intermediate FC fabric device in response to the time extension communication, the FC fabric session time period.

18. The method of claim 14, further comprising:

receiving, by the intermediate FC fabric device from the FC switch device subsequent to the passing of the FC fabric session time period and prior to receiving the second FC fabric login communication, a host exchange communication;

storing, by the intermediate FC fabric device, the host exchange communication; and providing, by the intermediate FC fabric device following the recreation of the FC fabric session between the endpoint device and the FC switch device, the host exchange communication to the endpoint device.

19. The method of claim 14, wherein the first FC fabric login communication includes a voluntary logout capability indicator that indicates that the endpoint device is capable of voluntarily logging out of the FC fabric.

20. The method of claim 14, wherein the FC switch device is configured to operate as if the FC fabric session exists following the ending of the FC fabric session and prior to the recreation of the FC fabric session.

* * * * *